Apr. 10, 1923.
R. L. TOLSON
1,451,088
BRACE FOR TRACTORS
Filed Nov. 23, 1921
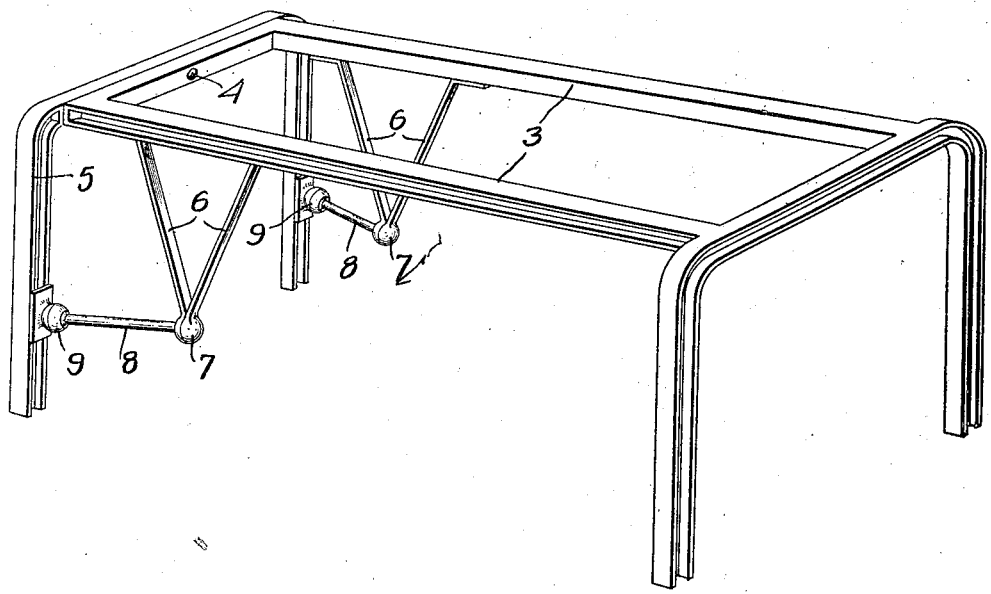
Inventor
Robert L. Tolson
By （signature）
Attorney Patented Apr. 10, 1923.

1,451,088

UNITED STATES PATENT OFFICE.

ROBERT LEE TOLSON, OF MEMPHIS, TENNESSEE, ASSIGNOR TO JOHN W. FARLEY, TRUSTEE, OF MEMPHIS, TENNESSEE.

BRACE FOR TRACTORS.

Application filed November 23, 1921. Serial No. 517,288.

*To all whom it may concern:*

Be it known that I, ROBERT LEE TOLSON, a citizen of the United States, residing at Memphis, in the county of Shelby and State of Tennessee, have invented certain new and useful Improvements in Braces for Tractors, of which the following is a specification.

My said invention relates to an improved axle brace for tractors. The purpose of the invention is to provide supporting means for a laterally rocking axle to prevent breaking or distortion of the pivot due to strains tending to wrench the axle away from the body of the tractor. The device is particularly intended for use in connection with a tractor of the type shown in my Patent No. 1,323,126, November 25, 1919, and is illustrated in connection with parts of the tractor.

Referring to the accompanying drawing which is made a part hereof and on which similar reference characters indicate similar parts, The figure is a perspective of a portion of a tractor showing the device in operative position.

In the drawing reference characters 3, 3 indicate the side members of the main frame of a tractor. This frame has a forwardly extending pivot 4, preferably a separate and readily removable king bolt, at its front end on which is pivoted a U-shaped front axle member 5 carrying the front wheels. These wheels are supported in the manner disclosed in my above described patent and it will be seen that the wheels with the axle may swing freely to accommodate the wheels to inequalities in the ground, without affecting the body of the tractor to any considerable extent. For example in passing over plowed ground or other rough ground one of the front wheels may drop into a furrow or chuck hole or run over a rock without tilting and straining the body of the tractor.

This motion of the axle should desirably be entirely free, but is necessarily limited owing to the fact that when one or both of the front wheels strikes an obstruction in moving forward or back there is a very considerable strain thrown on the pivot tending to move it up or down or to break it. To prevent such effect I have provided a brace for the axle which, as here shown, comprises a bracket 6 at each side of the main frame. Each bracket, at its lower end, has a cup-shaped portion 7 receiving a ball on a radius rod 8 which at the other end has a second similar ball received by a cup 9 at the rear side of the depending portion of the axle. The ends of the radius rod are held fast in the cups forming ball and socket connections. It will thus be seen that the axle is held firmly against backward and forward swinging movement while being permitted to swing to a considerable degree transversely of the tractor.

It will be obvious to those skilled in the art that my device may be modified without departing from the spirit of the invention, the true scope of which is shown by the appended claim.

Having thus fully described my said invention, what I claim as new and desire to secure by Letters Patent, is:

In a tractor, a body, an inverted U-shaped axle, a horizontal pivot connecting the axle to the body, a rigid V-shaped bracket extending down from the body at each side, said bracket being firmly bolted to the tractor-body framework, and connections between the axle and the brackets, consisting of a radius rod at each side of the tractor extending from the lower end of a bracket to the corresponding part of the U-shaped axle, the rods being connected to the axle and the bracket by ball and socket joints, substantially as set forth.

In witness whereof, I have hereunto set my hand and seal at Memphis, Tennessee, this 19 day of November, A. D. nineteen hundred and twenty-one.

ROBERT LEE TOLSON. [L. S.]

Witnesses:
 D. B. SWEENEY,
 JOHN W. FARLEY.